United States Patent
Zhou et al.

(10) Patent No.: US 11,601,965 B2
(45) Date of Patent: Mar. 7, 2023

(54) APPLIED BEAM UPDATED BEFORE A TRIGGERED TRANSMISSION TIME

(71) Applicant: QUALCOMM Incorporated, San Diego, CA (US)

(72) Inventors: Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 69 days.

(21) Appl. No.: 17/169,034

(22) Filed: Feb. 5, 2021

(65) Prior Publication Data

US 2021/0266942 A1 Aug. 26, 2021

Related U.S. Application Data

(60) Provisional application No. 62/981,015, filed on Feb. 24, 2020, provisional application No. 62/982,695, filed on Feb. 27, 2020.

(51) Int. Cl.
*H04W 72/12* (2009.01)
*H04W 72/04* (2009.01)
*H04L 5/00* (2006.01)
*H04W 72/044* (2023.01)

(52) U.S. Cl.
CPC ......... *H04W 72/1289* (2013.01); *H04L 5/001* (2013.01); *H04W 72/046* (2013.01)

(58) Field of Classification Search
None
See application file for complete search history.

(56) References Cited

U.S. PATENT DOCUMENTS

| | | | |
|---|---|---|---|
| 2019/0052331 A1* | 2/2019 | Chang | H04B 7/08 |
| 2019/0356371 A1* | 11/2019 | Osawa | H04W 72/0413 |
| 2020/0106498 A1* | 4/2020 | Zhou | H04B 7/0619 |
| 2020/0351818 A1* | 11/2020 | Park | H04W 4/90 |

(Continued)

FOREIGN PATENT DOCUMENTS

WO 2019099659 A1 5/2019

OTHER PUBLICATIONS

Ericsson: "Remaining Issues on Beam Measurement and Reporting", 3GPP TSG-RAN WG1 Meeting #93, 3GPP Draft, R1-1806217 Remaining Issues for Beam Measurement and Reporting, 3rd Generation Partnership Project (3GPP), Mobile Competence Centre, 650, Route Des Lucioles, F-06921 Sophia-Antipolis Cedex, vol. RAN WG1, No. Busan, Korea, May 21, 2018-May 25, 2018, May 20, 2018 (May 20, 2018), pp. 1-13.

(Continued)

*Primary Examiner* — Phirin Sam
(74) *Attorney, Agent, or Firm* — Patterson & Sheridan, L.L.P.

(57) ABSTRACT

Certain aspects of the present disclosure relate to wireless communications, and more particularly, to techniques for determining when to apply beam updates. A method that may be performed by a user equipment (UE) includes receiving signaling indicating a beam update, determining an application time of the beam update occurs between a downlink control information (DCI) scheduling a transmission and the scheduled transmission, and deciding whether to apply the beam update to the scheduled transmission.

29 Claims, 14 Drawing Sheets

(56) References Cited

U.S. PATENT DOCUMENTS

2021/0243659 A1* 8/2021 Cirik .................... H04L 5/0053

OTHER PUBLICATIONS

International Search Report and Written Opinion—PCT/US2021/017060—ISA/EPO—dated May 26, 2021.
LG Electronics: "Discussion on Multi-Beam Based Operations and Enhancements", 3GPP Draft, 3GPP TSG RAN WG1 Meeting #99, R1-1912270, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823335, 11 Pages.
Samsung: "On Beam Management, Measurement and Reporting", 3GPP TSG RAN WG1 Meeting #91, 3GPP Draft, R1-1720290_V1, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 17, 2017 (Nov. 17, 2017), XP051368939, 15 Pages.
Zte: "Maintenance of Enhancements on Multi-Beam Operation", 3GPP Draft, 3GPP TSG RAN WG1 Meeting #100-e, 31-2000240, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020, Feb. 15, 2020 (Feb. 15, 2020), XP051853235, 9 Pages.
Zte., et al., "Details and Evaluation Results on Beam Indication", 3GPP Draft, 3GPP TSG RAN WG1 Meeting #91, R1-1719538, Details and Evaluation Results on Beam Indication, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017 (Nov. 18, 2017), XP051369352, 11 Pages.

* cited by examiner

APPLIED BEAM UPDATED BEFORE A TRIGGERED TRANSMISSION TIME

CROSS-REFERENCE TO RELATED APPLICATION(S)

This application claims benefit of and priority to U.S. Provisional Application No. 62/981,015, filed Feb. 24, 2020, and U.S. Provisional Application No. 62/982,695, filed Feb. 27, 2020 which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for beam updates.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), TRP, etc. A BS or DU may communicate with a set of UEs on downlink (DL) channels (e.g., for transmissions from a BS or to a UE) and uplink (UL) channels (e.g., for transmissions from a UE to a BS or DU).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the DL and on the UL. To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

One or more aspects of the subject matter described in this disclosure can be implemented in a method for wireless communications by a user equipment (UE). The method generally includes receiving signaling indicating a beam update. The method generally includes determining an application time of the beam update occurs between a downlink control information (DCI) scheduling a transmission and the scheduled transmission. The method generally includes deciding whether to apply the beam update to the scheduled transmission.

One or more aspects of the subject matter described in this disclosure can be implemented in a method for wireless communications by a network entity. The method generally includes signaling a UE an indication of a beam update. The method generally includes determining an application time of the beam update occurs between a DCI scheduling a transmission and the scheduled transmission. The method generally includes deciding whether to apply the beam update to the scheduled transmission.

One or more aspects of the subject matter described in this disclosure can be implemented in an apparatus for wireless communication by a UE. The apparatus generally includes a memory and at least one processor coupled with the memory. The at least one processor coupled with the memory is generally configured to receive signaling indicating a beam update. The at least one processor coupled with the memory is generally configured to determine an application time of the beam update occurs between a DCI scheduling a transmission and the scheduled transmission. The at least one processor coupled with the memory is generally configured to decide whether to apply the beam update to the scheduled transmission.

One or more aspects of the subject matter described in this disclosure can be implemented in an apparatus for wireless communication by a network entity. The apparatus generally includes a memory and at least one processor coupled with the memory. The at least one processor coupled with the memory is generally configured to signal a UE an indication of a beam update. The at least one processor coupled with the memory is generally configured to determine an application time of the beam update occurs between a DCI scheduling a transmission and the scheduled transmission. The at least one processor coupled with the memory is generally configured to decide whether to apply the beam update to the scheduled transmission.

One or more aspects of the subject matter described in this disclosure can be implemented in an apparatus for wireless communication. The apparatus generally includes means for receiving signaling indicating a beam update. The apparatus generally includes means for determining an application time of the beam update occurs between a DCI scheduling a transmission and the scheduled transmission. The apparatus generally includes means for code for deciding whether to apply the beam update to the scheduled transmission.

One or more aspects of the subject matter described in this disclosure can be implemented in an apparatus for wireless communication. The apparatus generally includes means for signaling a UE an indication of a beam update. The apparatus generally includes means for determining an application time of the beam update occurs between a DCI scheduling a transmission and the scheduled transmission. The apparatus generally includes means for code for deciding whether to apply the beam update to the scheduled transmission.

One or more aspects of the subject matter described in this disclosure can be implemented in a computer readable medium having computer executable code stored thereon. The computer readable medium having computer executable code stored thereon generally includes code for receiving signaling indicating a beam update. The computer readable medium having computer executable code stored thereon generally includes code for determining an application time of the beam update occurs between a DCI scheduling a transmission and the scheduled transmission. The computer readable medium having computer executable code stored thereon generally includes code for deciding whether to apply the beam update to the scheduled transmission.

One or more aspects of the subject matter described in this disclosure can be implemented in a computer readable medium having computer executable code stored thereon. The computer readable medium having computer executable code stored thereon generally includes code for signaling a UE an indication of a beam update. The computer readable medium having computer executable code stored thereon generally includes code for determining an application time of the beam update occurs between a DCI scheduling a transmission and the scheduled transmission. The computer readable medium having computer executable code stored thereon generally includes code for deciding whether to apply the beam update to the scheduled transmission.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure, and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
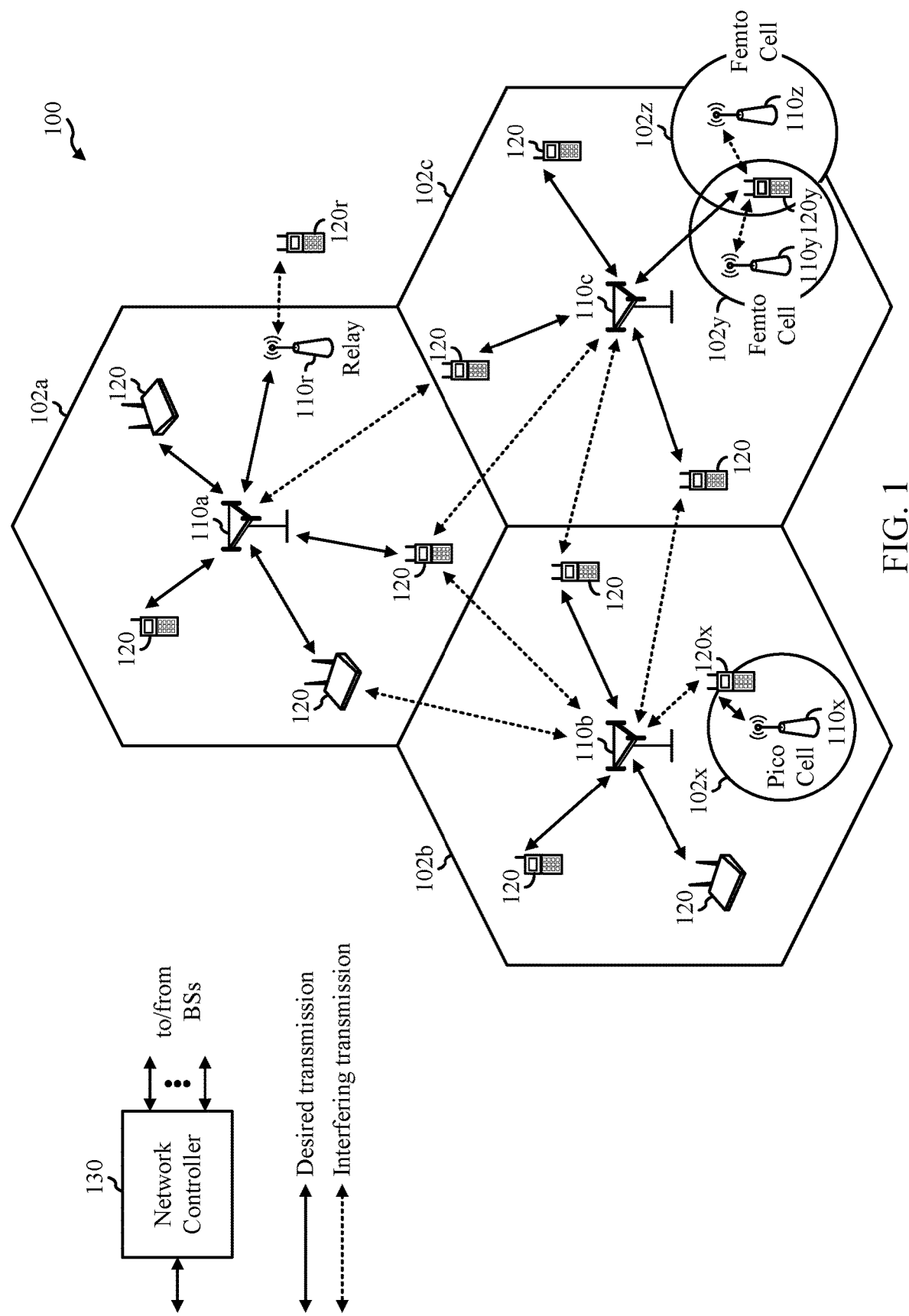
FIG. 1 is a block diagram conceptually illustrating an example telecommunications system, in accordance with certain aspects of the present disclosure.

Aspects of the present disclosure relate to wireless communications, and more particularly, to techniques for beam updates.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as Long Term Evolution (LTE), code division multiple access (CDMA), time division multiple access (TDMA), frequency division multiple access (FDMA), orthogonal frequency division multiple access (OFDMA), single-carrier frequency division multiple access (SC-FDMA), and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as New Radio (NR) (e.g. 5G RA), Evolved UTRA (E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDMA, etc. UTRA and E-UTRA are part of Universal Mobile Telecommunication System (UMTS).

NR is an emerging wireless communications technology under development in conjunction with the 5G Technology Forum (5GTF). 3GPP LTE and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine-type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 (e.g., a New Radio (NR)/5G network), in which aspects of the present disclosure may be performed. For example, the wireless network 100 may include a user equipment (UE) 120 configured to perform operations 1000 of FIG. 10 to process beam updates sent from a network entity (performing operations 1100 of FIG. 11) to perform beam refinement.

As illustrated in FIG. 1, the wireless network 100 may include a number of base stations (BSs) 110 and other network entities. A BS may be a station that communicates with UEs. Each BS 110 may provide communication coverage for a particular geographic area. In 3GPP, the term "cell" can refer to a coverage area of a NodeB (NB) and/or a NodeB subsystem serving this coverage area, depending on the context in which the term is used. In NR systems, the term "cell" and next generation NodeB (gNB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with a BS 110a and a UE 120r to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, gaming device, reality augmentation device (augmented reality (AR), extended reality (XR), or virtual reality (VR)), or any other suitable device that is configured to communicate via a wireless or wired medium.

Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink (DL) and single-carrier frequency division multiplexing (SC-FDM) on the uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a cyclic prefix (CP) on the UL and DL and include support for half-duplex operation using time division duplex (TDD). Beamforming may be supported and beam direction may be dynamically configured. Multiple-input multiple-output (MIMO) transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some scenarios, air interface access may be scheduled. For example, a scheduling entity (e.g., a BS, Node B, eNB, gNB, or the like) can allocate resources for communication among some or all devices and equipment within its service area or cell. The scheduling entity may be responsible for scheduling, assigning, reconfiguring, and releasing resources for one or more subordinate entities. That is, for scheduled communication, subordinate entities can utilize resources allocated by one or more scheduling entities.

BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

Turning back to FIG. 1, this figure illustrates a variety of potential deployments for various deployment scenarios. For example, in FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS. Other lines show component to component (e.g., UE to UE) communication options.

Figure 2:
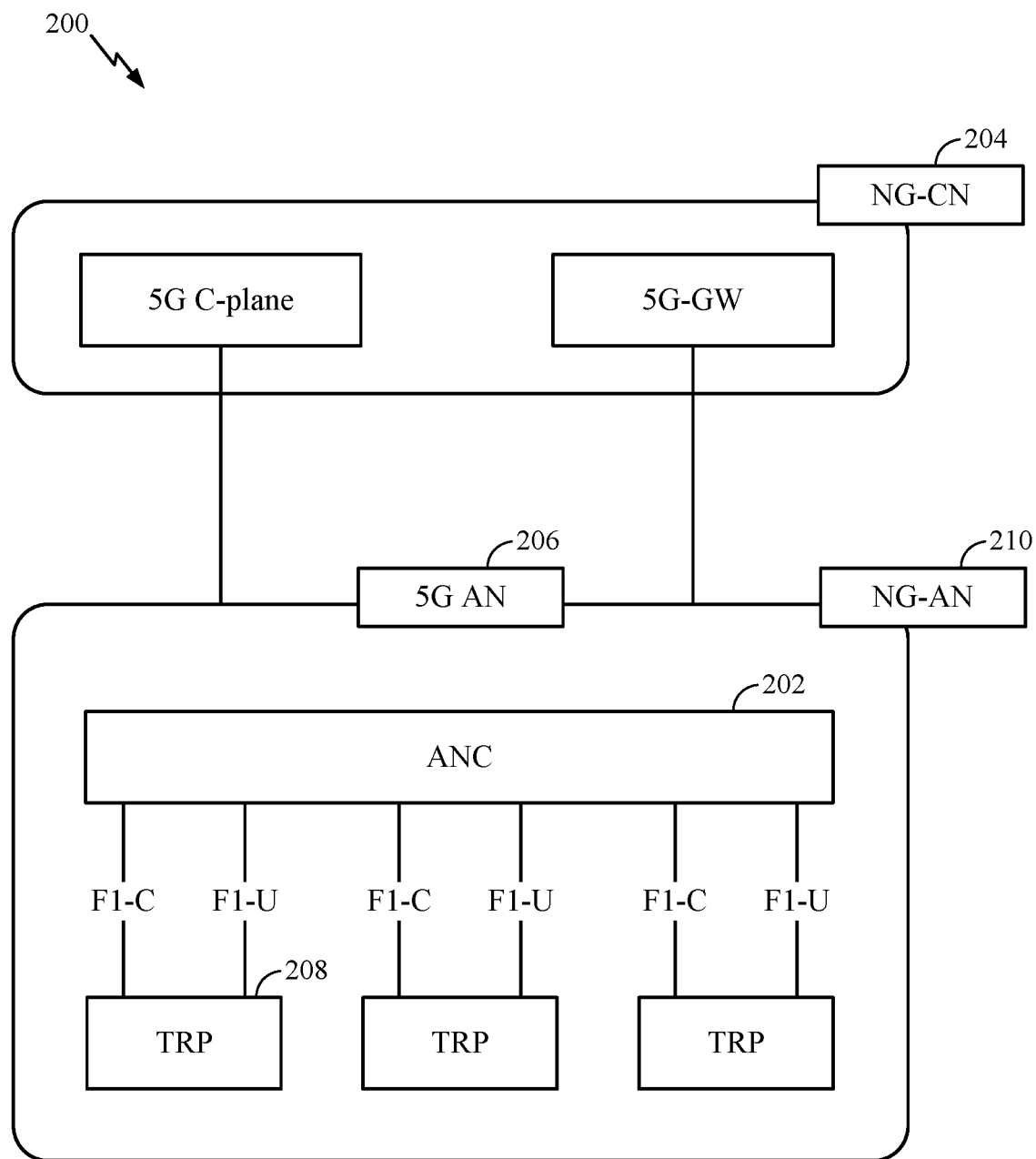
FIG. 2 is a block diagram illustrating an example logical architecture of a distributed radio access network (RAN), in accordance with certain aspects of the present disclosure.

FIG. 2 is a block diagram illustrating an example logical architecture of a distributed radio access network (RAN), in accordance with certain aspects of the present disclosure. The logical architecture of distributed RAN 200 may be implemented in the wireless communication network 100 illustrated in FIG. 1. A 5G access node (AN) 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific ANC deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support various backhauling and fronthauling solutions. This support may occur via and across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layer may be adaptably placed at the DU (e.g., TRP 208) or CU (e.g., ANC 202).

Figure 3:
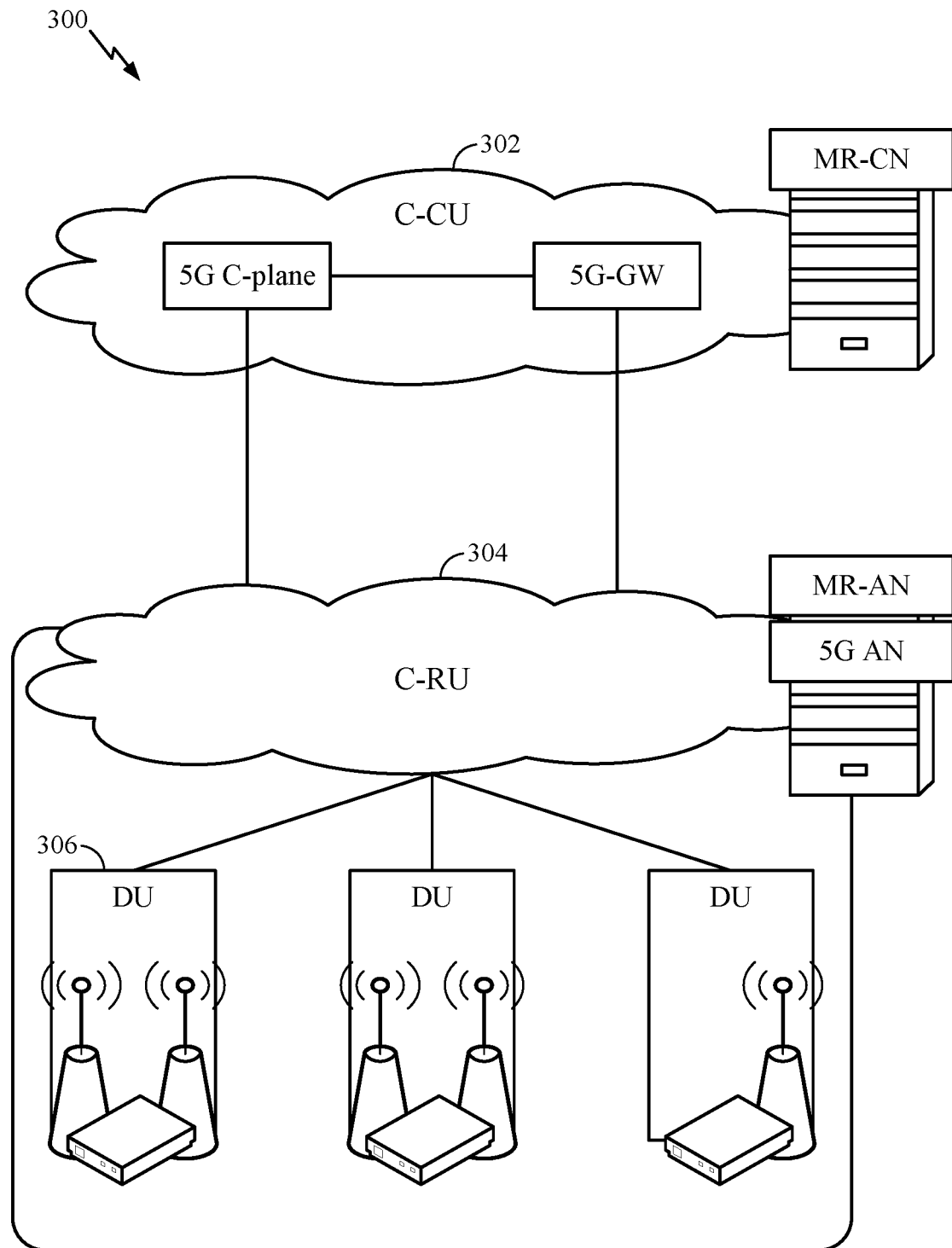
FIG. 3 is a diagram illustrating an example physical architecture of a distributed RAN, in accordance with certain aspects of the present disclosure.

FIG. 3 is a diagram illustrating an example physical architecture of a distributed RAN, in accordance with certain aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
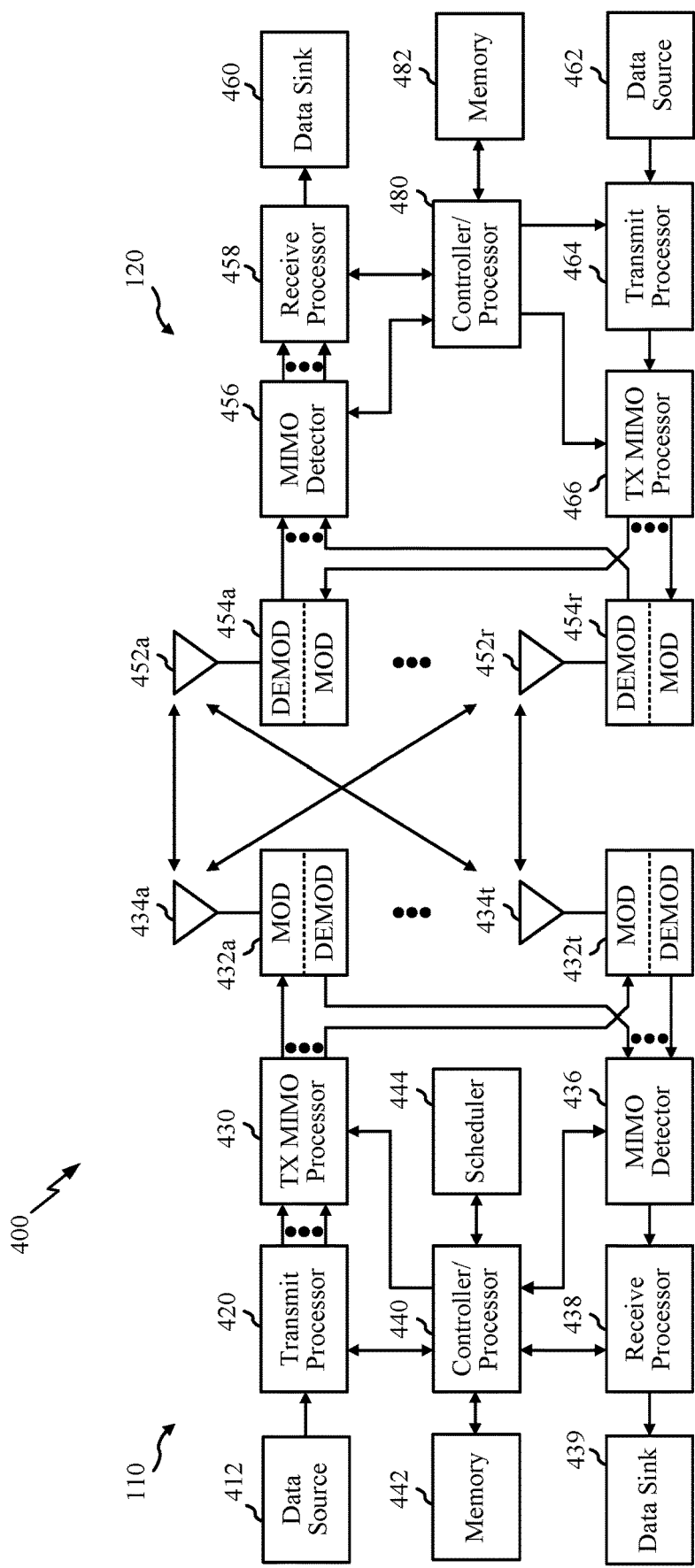
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1) which may be used to implement aspects of the present disclosure. For example, antennas 452, processors 466, 458, 464, and/or controller/processor 480 of the UE 120 may be used to perform operations 1000 of FIG. 10, while antennas 434, processors 420, 460, 438, and/or controller/processor 440 of the BS 110 may be used to perform operations 1100 of FIG. 11.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) MIMO processor 430 may perform spatial processing (e.g., precoding) on the data symbols, the control symbols, and/or the reference symbols, if applicable, and may provide output symbol streams to the modulators (MODs) in transceivers 432a-432t. Each modulator in transceivers 432a-432t may process a respective output symbol stream (e.g., for OFDM, etc.) to obtain an output sample stream. Each modulator may further process (e.g., convert to analog, amplify, filter, and upconvert) the output sample stream to obtain a downlink signal. DL signals from modulators in transceivers 432a-432t may be transmitted via the antennas 434a-434t, respectively.

At the UE 120, antennas 452a-452r may receive DL signals from the BS 110 and may provide received signals to demodulators (DEMODs) in transceivers 454a-454r, respectively. Each demodulator in transceivers 454a-454r may condition (e.g., filter, amplify, down convert, and digitize) a respective received signal to obtain input samples. Each demodulator may further process input samples (e.g., for OFDM, etc.) to obtain received symbols. A MIMO detector 456 may obtain received symbols from all demodulators in transceivers 454a-454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the UL, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a-454r (e.g., for SC-FDM, etc.), and transmitted to the BS 110. At the BS 110, UL signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct operations at the BS 110 and the UE 120, respectively. The processor 440 and/or other processors and modules at the BS 110 may perform or direct execution of processes for techniques described herein. The memories 442 and 482 may store data and program codes for BS 110 and UE 120, respectively. A scheduler 444 may schedule UEs for data transmission on the DL and/or UL.

Figure 5:
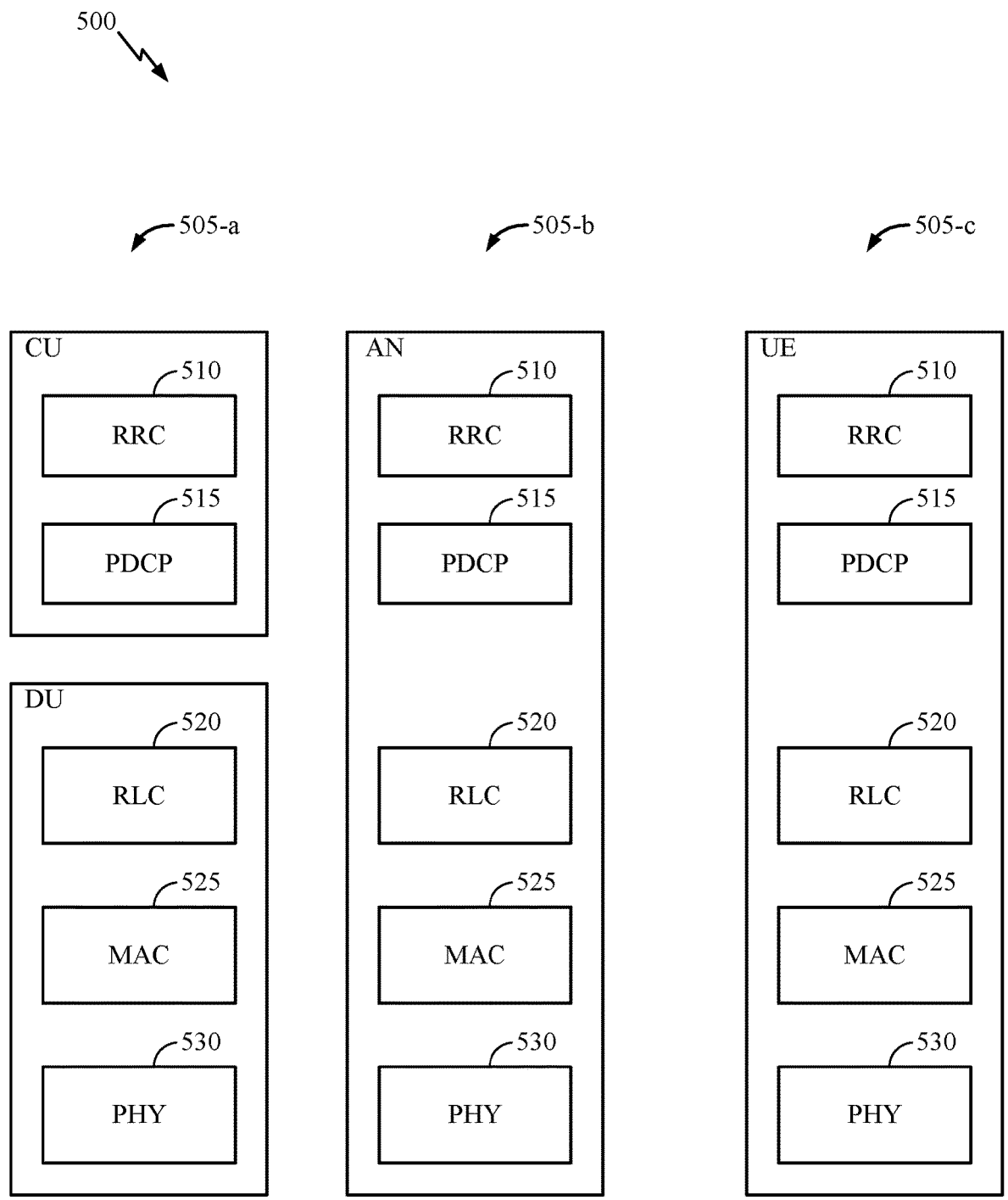
FIG. 5 is a diagram showing examples for implementing a communication protocol stack, in accordance with certain aspects of the present disclosure.

FIG. 5 is a diagram showing examples of communication protocol stacks, in accordance with certain aspects of the present disclosure. The illustrated communications protocol stacks may be implemented by devices operating in a wireless communication system, such as a 5G system (e.g., a system that supports UL-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or application specific integrated circuit (ASIC), portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the CU, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

Embodiments discussed herein may include a variety of spacing and timing deployments. For example, in LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, slots) depending on the subcarrier spacing. The NR resource block (RB) is 12 consecutive frequency subcarriers. NR may support a base subcarrier spacing (SCS) of 15 KHz and other SCS may be defined with respect to the base SCS, for example, 30 kHz, 60 kHz, 120 kHz, 240 kHz, etc. The symbol and slot lengths scale with the SCS. The CP length also depends on the SCS.

Figure 6:
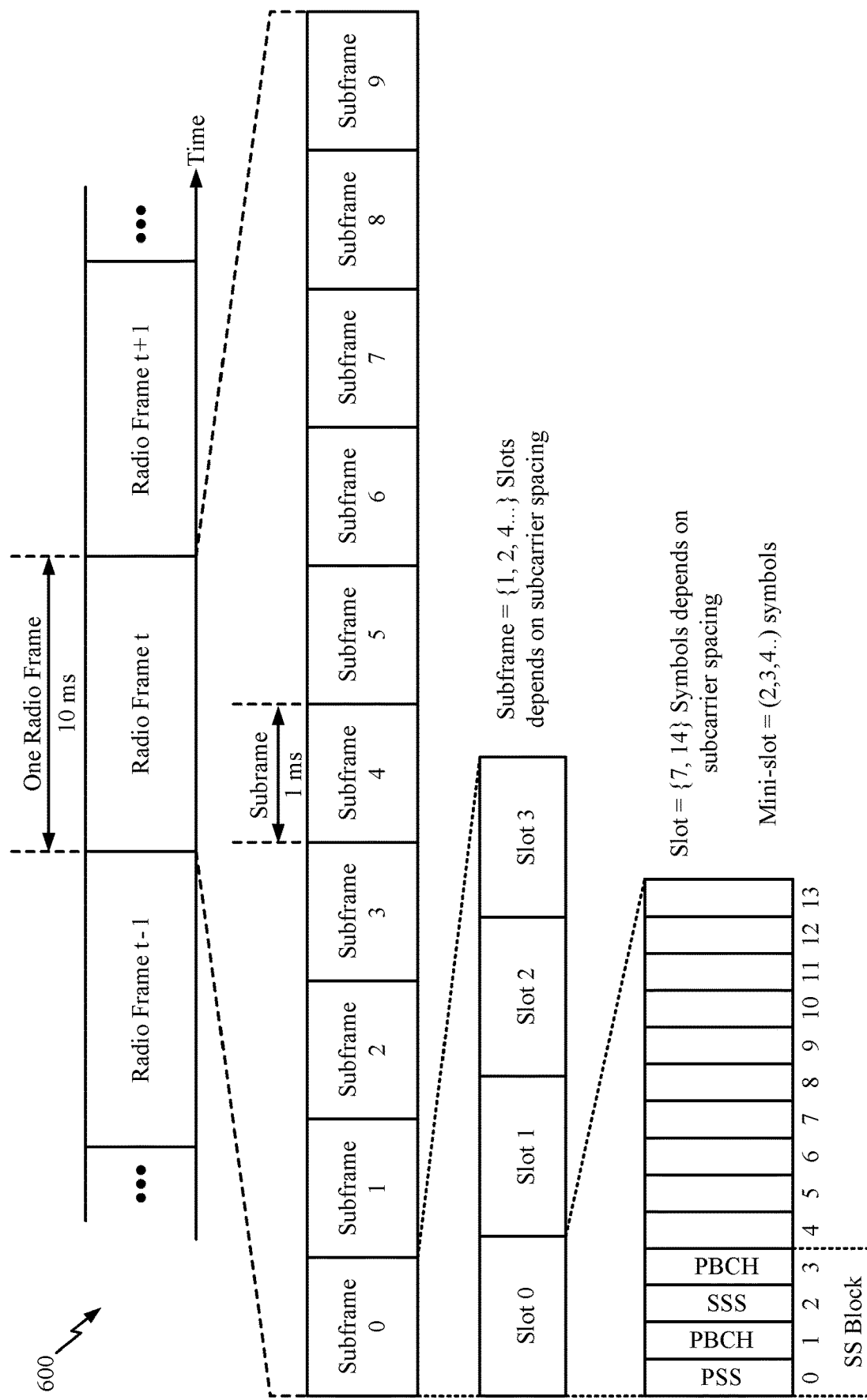
FIG. 6 illustrates an example of a frame format for a new radio (NR) system, in accordance with certain aspects of the present disclosure.

FIG. 6 illustrates an example of a frame format 600 for a new radio (NR) system, in accordance with certain aspects of the present disclosure. The transmission timeline for each of the DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 6. The PSS and SSS may be used by UEs for cell search and acquisition. The PSS may provide half-frame timing, and the SS may provide the CP length and frame timing. The PSS and SSS may provide the cell identity. The PBCH carries some basic system information, such as DL system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Figure 7:
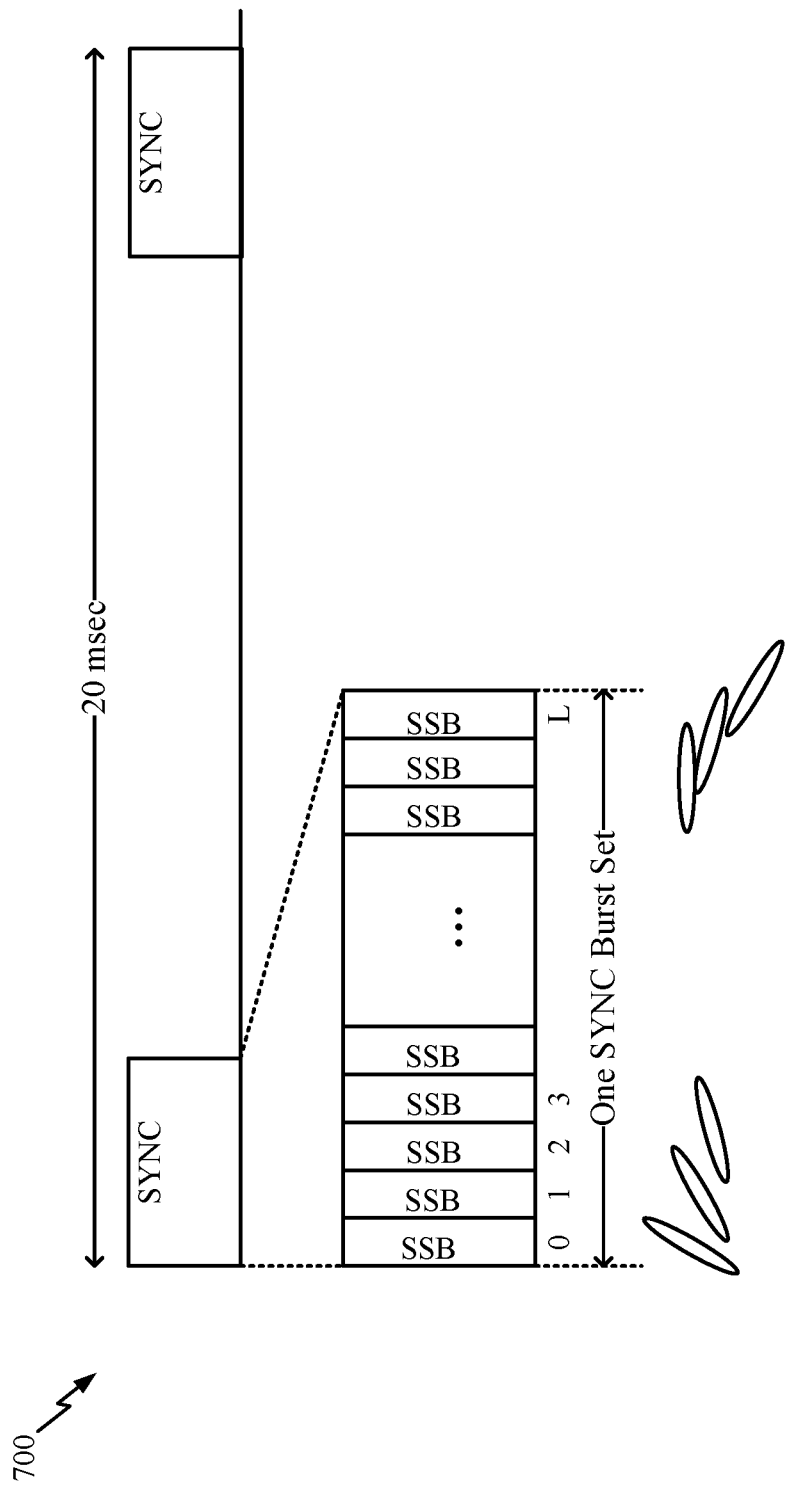
FIG. 7 illustrates how different synchronization signal blocks (SSBs) may be sent using different beams, in accordance with certain aspects of the present disclosure.

As shown in FIG. 7, the SSBs may be organized into SS burst sets to support beam sweeping. As shown, each SSB within a burst set may be transmitted using a different beam, which may help a UE quickly acquire both transmit (TX) and receive (RX) beams (particular for mmW applications). A physical cell identity (PCI) may be decoded from the PSS and SSS of the SSB.

Certain deployment scenarios may include one or both NR deployment options. Some may be configured for a non-standalone (NSA) and/or a standalone (SA) option. A standalone cell may need to broadcast both SSB and RMSI, for example, with two SIBs (e.g., SIB1 and SIB2). A non-standalone cell may only need to broadcast SSB, without broadcasting RMSI. In a single carrier in NR, multiple SSBs may be sent in different frequencies, and may include the different types of SSBs.

Control Resource Sets (CORESETs)

A control resource set (CORESET) for an orthogonal frequency division multiple access (OFDMA) system (e.g., a communications system transmitting a physical downlink control channel (PDCCH) using OFDMA waveforms) may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given user equipment (UE). Search spaces may be areas or portions where a communication device (e.g., a UE) may look for control information.

According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (New Radio (NR) PDCCHs (NR-PDCCHs)) with different numbers of CCEs in the sets used to transmit NR-PDCCHs using differing aggregation levels. Multiple sets of CCEs may be defined as search spaces for UEs, and thus a NodeB, or other base station (BS), may transmit an NR-PDCCH to a UE by transmitting the NR-PDCCH in a set of CCEs that may be defined as a decoding candidate within a search space for the UE, and the UE may receive the NR-PDCCH by searching in search spaces for the UE and decoding the NR-PDCCH transmitted by the NodeB (or other BS).

Operating characteristics of a NodeB or other BS in a NR communications system may be dependent on a frequency range (FR) in which the system operates. A FR may comprise one or more operating bands (e.g., "n1" band, "n2" band, "n7" band, and "n41" band), and a communications system (e.g., one or more BSs/NodeBs and UEs) may operate in one or more operating bands. Frequency ranges and operating bands may be described in more detail in "Base Station (BS) radio transmission and reception" Technical Specification (TS) 38.104 (Release 15), which may be available from the 3rd Generation Partnership Project (3GPP) website.

As described above, a CORESET may be a set of time and frequency domain resources. The CORESET may be configured for conveying PDCCH within system bandwidth. A UE may determine a CORESET and monitor the CORESET for control channels. During initial access, a UE may identify an initial CORESET (CORESET #0) configuration from a field (e.g., pdcchConfigSIB1) in a master information block (MIB). This initial CORESET may then be used to configure the UE (e.g., with other CORESETs and/or bandwidth parts (BWPs) via dedicated (UE-specific) signaling). When the UE detects a control channel in the CORESET, the UE may attempt to decode the control channel and communicate with the transmitting BS (e.g., the transmitting cell) according to the control data provided in the control channel (e.g., transmitted via the CORESET).

According to aspects of the present disclosure, when a UE is connected to a cell (or BS), the UE may receive a MIB. The MIB may be in a synchronization signal and physical broadcast channel (SS/PBCH) block (e.g., in the PBCH of the SS/PBCH block) on a synchronization raster (sync raster). In some scenarios, the sync raster may correspond to an SSB. From the frequency of the sync raster, the UE may determine an operating band of the cell. Based on a cell's operation band, the UE may determine a minimum channel bandwidth and a subcarrier spacing (SCS) of the channel. The UE may then determine an index from the MIB (e.g., four bits in the MIB, conveying an index in a range 0-15).

Given this index, the UE may look up or locate a CORESET configuration (this initial CORESET configured via the MIB is generally referred to as CORESET #0). This may be accomplished from one or more tables of CORESET configurations. These configurations (including single table scenarios) may include various subsets of indices indicating valid CORESET configurations for various combinations of minimum channel bandwidth and SCS. In some arrangements, each combination of minimum channel bandwidth and SCS may be mapped to a subset of indices in the table.

Alternatively or additionally, the UE may select a search space CORESET configuration table from several tables of CORESET configurations. These configurations may be based on a minimum channel bandwidth and SCS. The UE may then look up a CORESET configuration (e.g., a Type0-PDCCH search space CORESET configuration) from the selected table, based on the index. After determining the CORESET configuration (e.g., from the single table or the selected table), the UE may then determine the CORESET to be monitored (as mentioned above) based on the location (in time and frequency) of the SS/PBCH block and the CORESET configuration.

Figure 8:
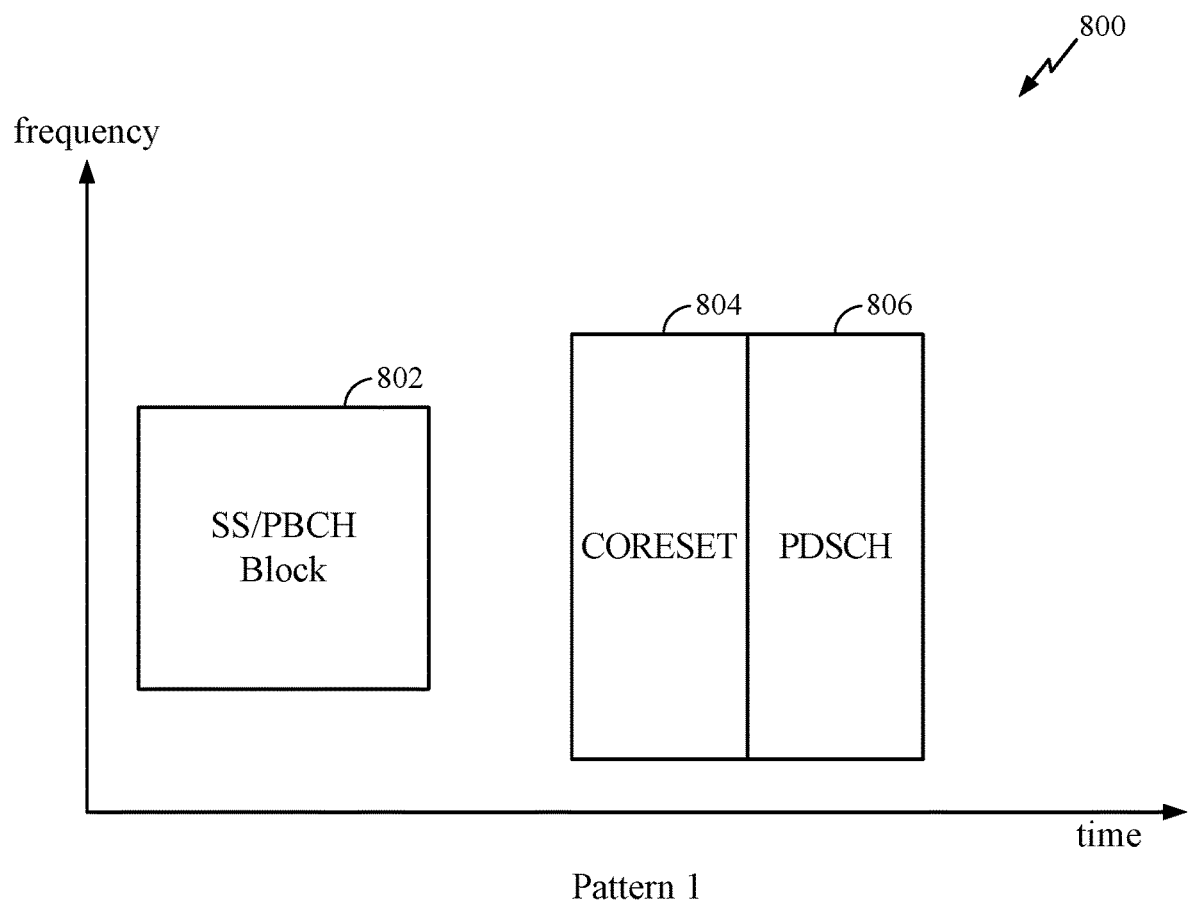
FIG. 8 illustrates an exemplary transmission resource mapping, in accordance with certain aspects of the present disclosure.

FIG. 8 illustrates an exemplary transmission resource mapping 800, in accordance with certain aspects of the present disclosure. In the exemplary transmission resource mapping 800, a BS (e.g., BS 110a shown in the wireless communication network 100 of FIG. 1) transmits an SS/PBCH block 802. The SS/PBCH block 802 may include a MIB conveying an index to a table that relates the time and frequency resources of the CORESET 804 to the time and frequency resources of the SS/PBCH block 802.

The BS may also transmit control signaling. In some scenarios, the BS may transmit a PDCCH to a UE (e.g., UE 120a shown in the wireless communication network 100 of FIG. 1) in the (time/frequency resources of the) CORESET. The PDCCH may schedule a PDSCH 806. The BS may then transmit the PDSCH to the UE. The UE may receive the MIB in the SS/PBCH block 802, determine the index, look up a CORESET configuration based on the index, and determine the CORESET from the CORESET configuration and the SS/PBCH block 802. The UE may then monitor the CORESET, decode the PDCCH in the CORESET, and receive the PDSCH 806 that was allocated by the PDCCH.

Different CORESET configurations may have different parameters that define a corresponding CORESET. For example, each configuration may indicate a number of resource blocks (RBs) (e.g., 24, 48, or 96), a number of symbols (e.g., 1-3), as well as an offset (e.g., 0-38 RBs) that may indicate a location in frequency.

Quasi Co-Location (QCL) Port and Transmission Configuration Indicator (TCI) States In many cases, it may be important for a user equipment (UE) to know which assumptions it may make on a channel corresponding to different transmissions. For example, the UE may need to know which reference signals it may use to estimate the channel in order to decode a transmitted signal (e.g., physical downlink control channel (PDCCH) or physical downlink shared channel (PDSCH)). It may also be important for the UE to be able to report relevant channel state information (CSI) to a base station (BS) (or gNB) for scheduling, link adaptation, and/or beam management purposes. In New Radio (NR), the concept of quasi co-location (QCL) and transmission configuration indicator (TCI) states may be used to convey information about these assumptions.

QCL assumptions may be defined in terms of channel properties. Per 3rd Generation Partnership Project (3GPP) Technical Specification (TS) 38.214, "two antenna ports are said to be quasi-co-located if properties of the channel over which a symbol on one antenna port is conveyed can be inferred from the channel over which a symbol on the other antenna port is conveyed." Different reference signals may be considered quasi co-located ("QCL'd") if a receiver (e.g., a UE) can apply channel properties determined by detecting a first reference signal (RS) to help detect a second RS. TCI states generally include configurations such as QCL-relationships, for example, between the downlink (DL) RSs in one CSI-RS set and the PDSCH demodulation reference signal (DMRS) ports.

In some cases, a UE may be configured with up to M TCI-States. Configuration of the M TCI-States may come about via higher layer signalling, while a UE may be signalled to decode PDSCH according to a detected PDCCH with downlink control information (DCI) indicating one of the TCI states. Each configured TCI state may include one RS set TCI-RS-SetConfig that indicates different QCL assumptions between certain source and target signals.

Figure 9:
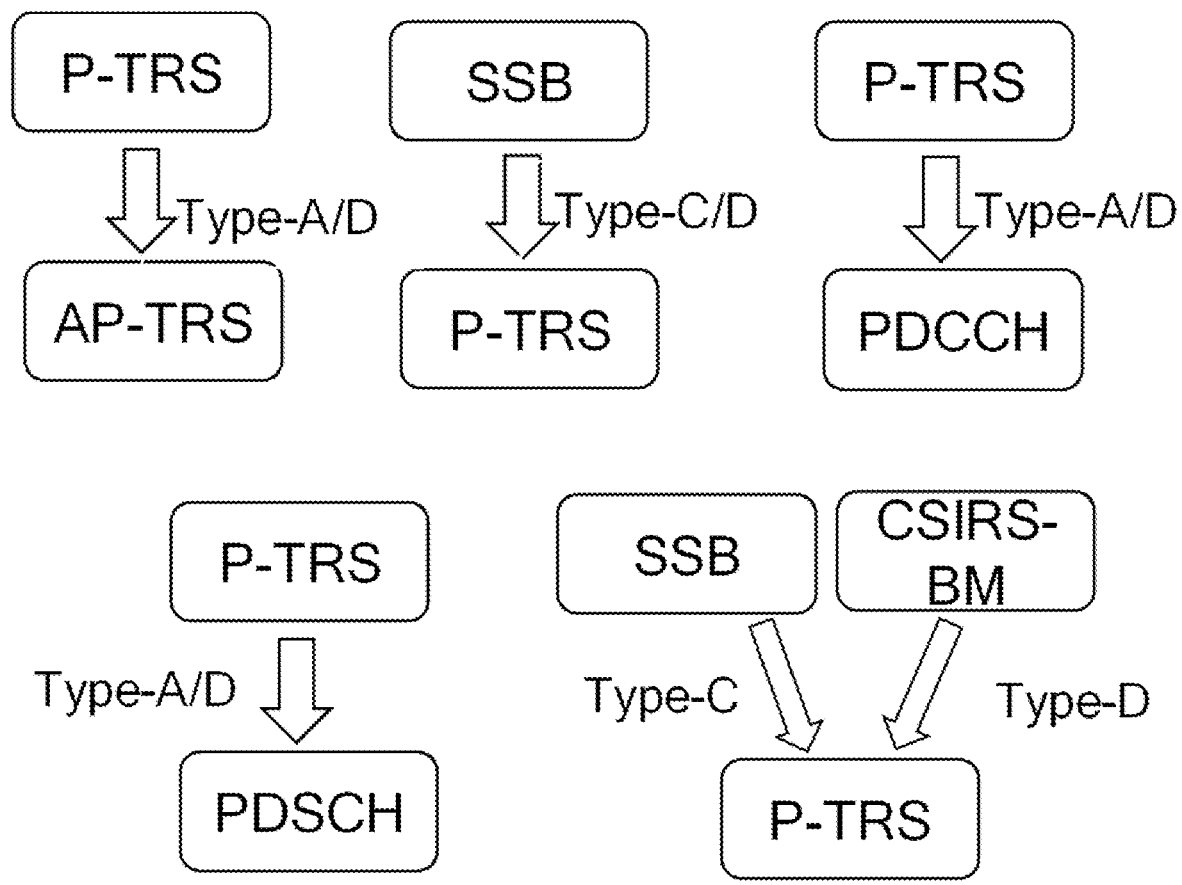
FIG. 9 illustrates example quasi co-location (QCL) relationships, in accordance with certain aspects of the present disclosure.

FIG. 9 illustrates example QCL relationships, in accordance with certain aspects of the present disclosure. More specifically, FIG. 9 illustrates examples of the association of DL RSs with corresponding QCL types that may be indicated by a TCI-RS-SetConfig.

In the examples of FIG. 9, a source RS may be indicated in the top block and may be associated with a target signal indicated in the bottom block. In this context, a target signal may refer to a signal for which channel properties may be inferred by measuring those channel properties for an associated source signal. As noted above, a UE may use the source RS to determine various channel parameters, depending on the associated QCL type. Further, the UE may use those various channel parameters (determined based on the source RS) to process the target signal. A target RS may not necessarily need to be a PDSCH's DMRS, rather it may be any other RS: physical uplink shared channel (PUSCH) DMRS, CSI-RS, tracking reference signal (TRS), and sounding reference signal (SRS).

As illustrated, each TCI-RS-SetConfig may contain parameters. These parameters may, for example, configure QCL relationship(s) between RSs in the RS set and the DMRS port group of the PDSCH. The RS set may contain a reference to either one or two DL RSs and an associated QCL-Type for each one configured by the higher layer parameter QCL-Type.

As illustrated in FIG. 9, for the case of two DL RSs, the QCL types may take on a variety of arrangements. For example, QCL types may not be the same, regardless of whether the references are to the same DL RSs or different DL RSs. In the illustrated example, a SSB may be associated with Type C QCL for phase tracking reference signal (P-TRS), while CSI-RS for beam management (CSIRS-BM) may be associated with Type D QCL.

QCL information and/or types may, in some scenarios, depend on or be a function of other information. For example, the QCL types indicated to the UE may be based on higher layer parameter QCL-Type and may take one or a combination of the following types:

QCL-TypeA: {Doppler shift, Doppler spread, average delay, delay spread},
QCL-TypeB: {Doppler shift, Doppler spread},
QCL-TypeC: {average delay, Doppler shift}, and
QCL-TypeD: {Spatial Rx parameter}, Spatial QCL assumptions (QCL-TypeD) may be used to help a UE select an analog receive (RX) beam (e.g., during beam management procedures). For example, an SSB resource indicator may indicate a same beam for a previous RS should be used for a subsequent transmission.

An initial CORESET (e.g., CORESET ID 0 or simply CORESET #0) in NR may be identified during initial access by a UE (e.g., via a field in the MIB). A ControlResourceSet information element (CORESET IE), sent via radio resource control (RRC) signaling, may convey information regarding a CORESET configured for a UE. The CORESET IE may include a CORESET ID, an indication of frequency domain resources (e.g., number of RBs) assigned to the CORESET, contiguous time duration of the CORESET in a number of symbols, and TCI states.

As noted above, a subset of the TCI states provide QCL relationships between DL RS(s) in one RS set (e.g., TCI-Set) and PDCCH DMRS ports. A particular TCI state for a given UE (e.g., for unicast PDCCH) may be conveyed to the UE via a Medium Access Control (MAC) Control Element (MAC-CE). The particular TCI state may be selected from the set of TCI states conveyed by the CORESET IE, with the initial CORESET (CORESET #0) generally configured via the MIB.

Search space information may also be provided via RRC signaling. For example, the Search Space IE may be another RRC IE that defines how and where to search for PDCCH candidates for a given CORESET. Each search space may be associated with one CORESET. The Search Space IE may identify a search space configured for a CORESET by a search space ID. In an aspect, the search space ID associated with CORESET #0 may be Search Space ID #0. The search space may be configured via PBCH (MIB).

Example Applied Beam Updated Before a Triggered Transmission Time

Certain aspects of the present disclosure provide techniques for determining when to apply beam updates.

Figure 12:
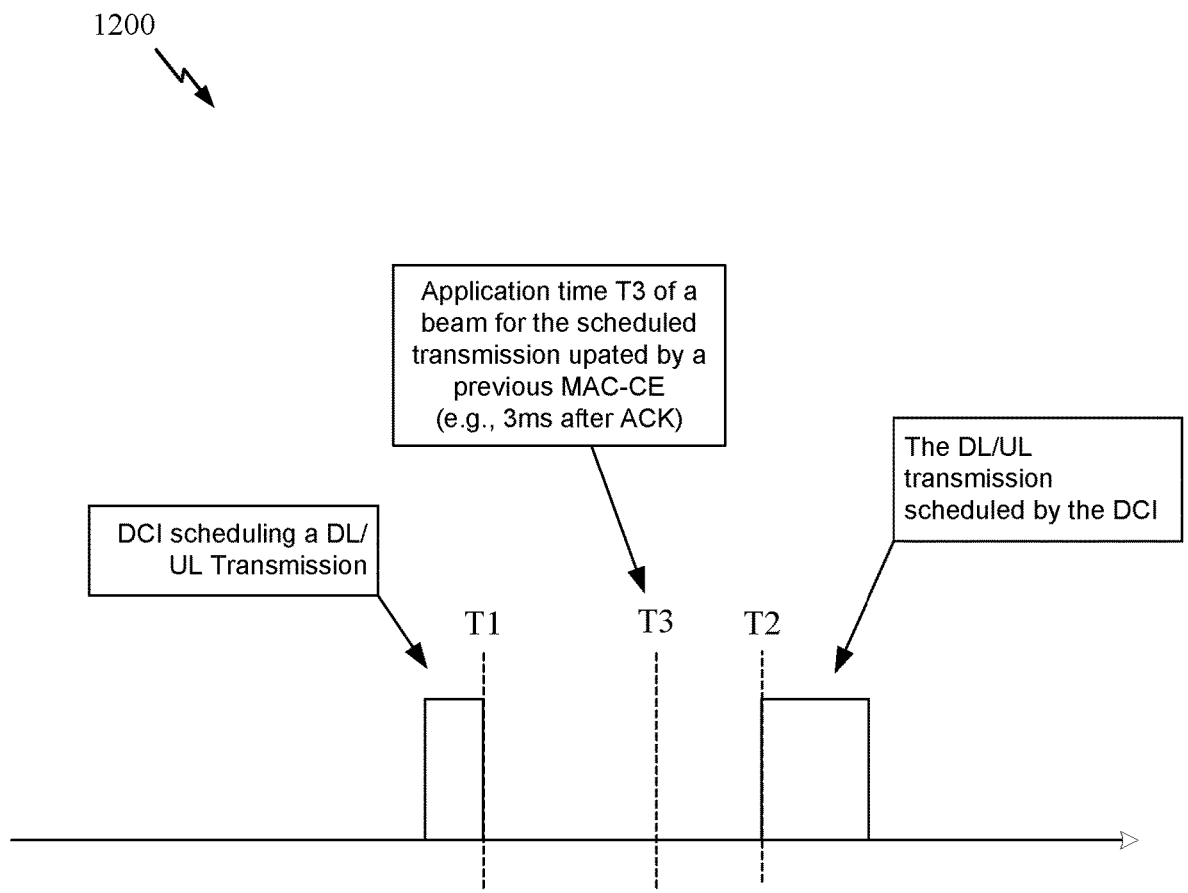
FIG. 12 is a timing diagram indicating timing used for deciding whether to apply beam updates, in accordance with certain aspects of the present disclosure.

Various timings may be defined for an applied beam updated prior to a triggered transmission time. For example, FIG. 12 is a timing diagram indicating timing used for deciding whether to apply beam updates, in accordance with certain aspects of the present disclosure. As shown in FIG. 12, T1 may refer to the end of downlink control information (DCI) scheduling a downlink (DL) or uplink (UL) transmission (e.g., physical downlink shared channel (PDSCH), physical uplink shared channel (PUSCH), physical uplink control channel (PUCCH), aperiodic channel state information reference signal (AP CSI-RS), aperiodic sounding reference signal (AP SRS)). T2 may refer to the start time of the DL or UL transmission scheduled by the DCI (with an end at T1). Generally, in some aspects, T2 must be greater than T1. T3 may refer to the application time of a beam update for the scheduled transmission, which may be updated by a previously sent medium access control (MAC) control element (CE). For example, T3 may be 3 milliseconds (ms) after the end of an acknowledgement (ACK) by a user equipment (UE) for PDSCH carrying the MAC-CE updating the beam.

In some cases, the beam may be indicated via transmission configuration indicator (TCI) states, spatial relations, or UL TCI states.

In some cases, if the applicable time (T3) of the beam update for the scheduled transmission is between the scheduling DCI (T1) and the scheduled transmission (T2) (e.g., if T3 occurs between T1 and T2 as shown in FIG. 12), the UE may not have enough time to apply the updated beam to the scheduled transmission. Specifically, the duration between T3 and T2 may be too small, thereby not providing enough time to apply the beam update to the scheduled transmission.

Aspects of the present disclosure provide various techniques to clarify when a beam update may be applied in such cases.

Figure 10:
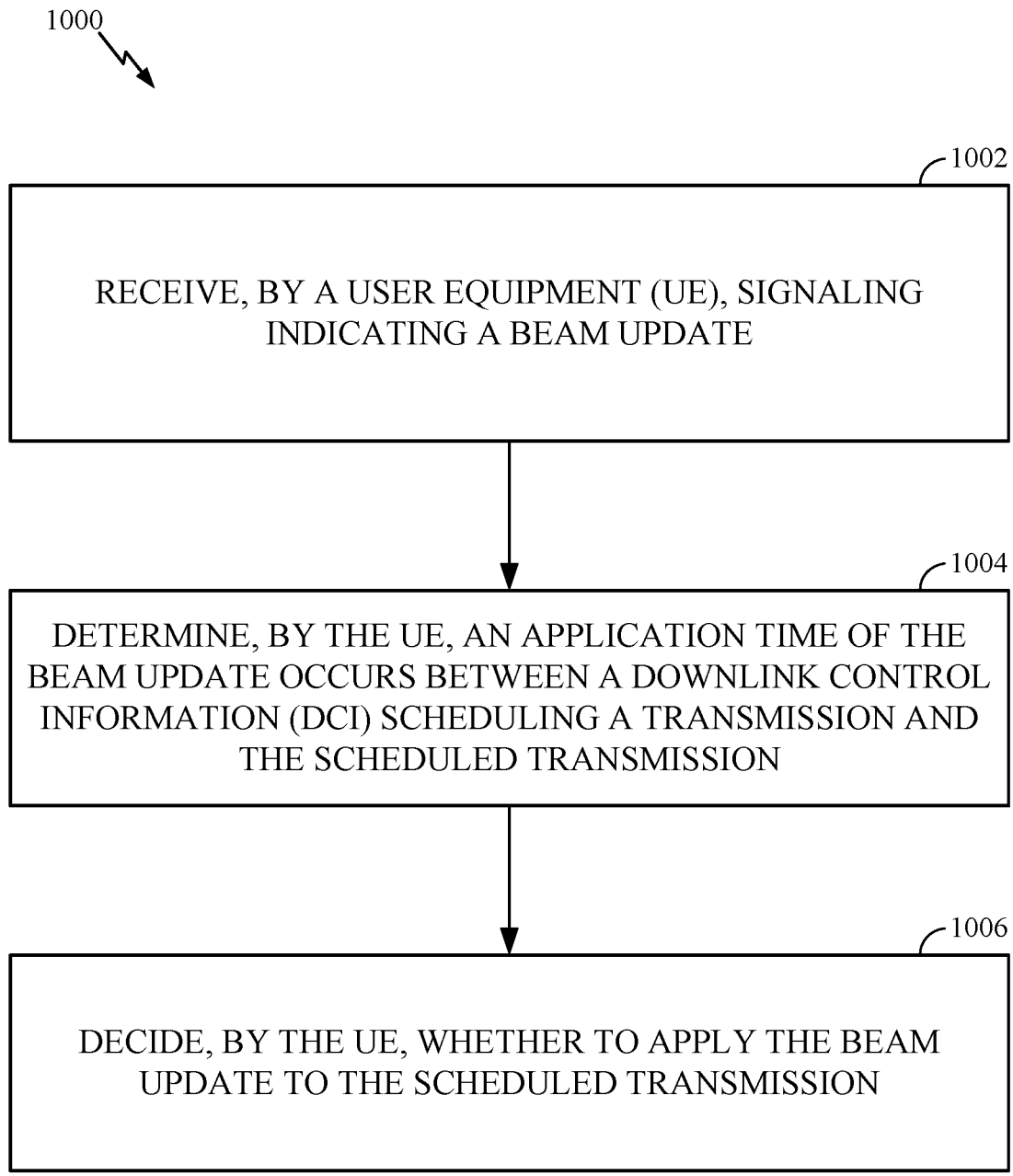
FIG. 10 is a flow diagram illustrating example operations for wireless communication by a UE, in accordance with certain aspects of the present disclosure.

FIG. 10 is a flow diagram illustrating example operations 1000 for wireless communication by a UE, in accordance with certain aspects of the present disclosure. The operations 1000 may be performed, for example, by the UE 120a in the wireless communication network 100. The operations 1000 may be implemented as software components that are executed and run on one or more processors (e.g., controller/processor 280 of FIG. 2). Further, the transmission and reception of signals by the UE in operations 1000 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1000 may begin, at block 1002, by a UE receiving signaling indicating a beam update.

At block 1004, the UE determines an applicable time of the beam update occurs between a DCI scheduling a transmission and the scheduled transmission.

At block 1006, the UE decides whether to apply the beam update to the scheduled transmission.

Figure 11:
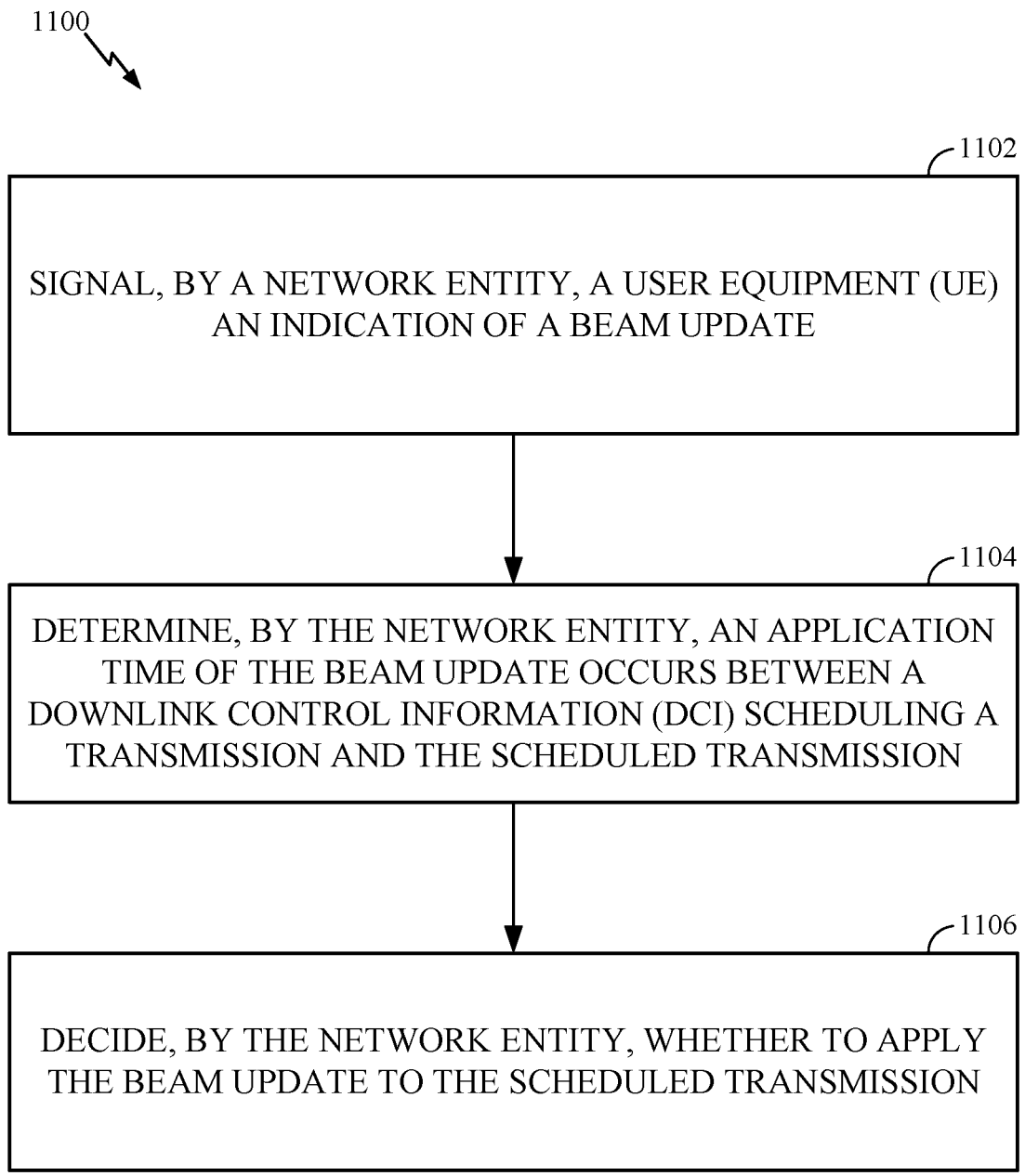
FIG. 11 is a flow diagram illustrating example operations for wireless communication by a network entity, in accordance with certain aspects of the present disclosure.

FIG. 11 is a flow diagram illustrating example operations 1100 for wireless communication by a network entity, in accordance with certain aspects of the present disclosure. The operations 1100 may be performed, for example, by a base station (BS) (e.g., such as the BS 110*a* in the wireless communication network 100). The operations 1100 may be complementary to the operations 1000 performed by the UE. The operations 1100 may be implemented as software components that are executed and run on one or more processors (e.g., controller/processor 240 of FIG. 2). Further, the transmission and reception of signals by the BS in operations 1100 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1100 may begin, at block 1102, by signaling a UE an indication of a beam update.

At block 1104, the network entity determines an applicable time of the beam update occurs between a DCI scheduling a transmission and the scheduled transmission.

At block 1106, the network entity decides whether to apply the beam update to the scheduled transmission.

According to certain aspects, an updated beam may not be applied to a scheduled transmission when the application time of the beam update occurs after a scheduling DCI (e.g., T1) and before the DL/UL transmission (e.g., T3) scheduled by the DCI where the updated beam is applied (e.g., the scenario shown in FIG. 12, where T2 is between T1 and T3, may be considered invalid).

In some cases, the beam update may be indicated via a TCI state, a spatial relation, or an UL TCI state.

In some cases, the beam update may be indicated via a MAC-CE. For a MAC-CE based beam update, the application time of the updated beam may be three ms after the end of ACK feedback for PDSCH carrying the MAC-CE updating the beam.

According to certain aspects, an updated beam may be applied when the application time of the beam update is after a scheduling DCI (e.g., T1) and before the DL/UL transmission (e.g., T3) scheduled by the DCI where the updated beam is applied (e.g., the scenario shown in FIG. 12, where T2 is between T1 and T3, may be considered valid).

In some cases, if the duration between the application time of the updated beam and the start of a scheduled transmission (e.g., duration between T2 and T3) exceeds a minimum duration, the updated beam may be applied to the scheduled transmission. Otherwise, the originally configured beam before the beam update may continue to apply to the scheduled transmission.

In some cases, the minimum duration may be a fixed value. For example, the minimum duration may be a fixed value of zero.

In some cases, the minimum duration may be based, at least in part, on UE capability.

In some cases, the minimum duration may further depend on subcarrier spacing (SCS) of scheduling a component carrier (CC) and a scheduled CC. For example, the minimum duration may depend, at least in part, on a SCS of a first CC of the DCI and a second CC of the scheduled transmission. In some examples, the minimum duration may be based on a smallest SCS of the first and second CCs. For example, if the smallest SCS of scheduling and scheduled CCs is 120 kilohertz (kHz), a minimum duration may be 28 symbols based on the smallest SCS.

According to certain aspects, a DCI may schedule multiple DL/UL transmissions with a same beam or different beam per transmission (e.g. DCI triggering transmission of multiple aperiodic (AP) sounding reference signal (SRS) resources with a same beam or a different beam per SRS resource).

In some cases, the indicated beam per transmission in the DCI may be based on the updated beam per transmission before the start of the first transmission. For example, where DCI schedules multiple transmissions, if a previous MAC-CE updates the beam for the third SRS resource for the third transmission scheduled by the DCI and the corresponding applicable time for the new beam (e.g., T3 for the third SRS resource) is after the start of first transmission scheduled by the DCI (e.g., after T2 of the first SRS resource), the UE may continue to use the beam applied before the update for the third transmission of the third SRS resource.

In some cases, the indicated beam per transmission in the DCI may be based on the updated beam per transmission before the first transmission, or before the start of a corresponding transmission. For example, where DCI schedules multiple transmissions, if a previous MAC-CE updates the beam for a third SRS resource for a third transmission scheduled by the DCI, and the corresponding applicable time for the new beam (e.g., T3 for the third SRS resource) is after the start of first transmission (e.g., after T2 of the first SRS resource) but before the start of third transmission (e.g., before T2 of the third SRS resource) scheduled by the DCI, a UE may use the updated beam for the third transmission of the third SRS resource.

According to certain aspects, when the spatial relation for AP SRS is updated by a MAC-CE, and the HARQ-ACK corresponding to the MAC-CE is transmitted in slot n, the updated spatial relation may be active starting from slot n+3 ms.

In some cases, the active spatial relation at a beginning of the AP SRS transmission, or at a beginning of the slot of the AP SRS transmission, may be applied to the scheduled AP SRS transmission.

In some cases, the active spatial relation at a beginning of the PDCCH that triggers the AP SRS transmission, or at a beginning of the slot of the PDCCH that triggers the AP SRS transmission, may be applied to the AP SRS transmission.

In some aspects, the decision whether to apply the active spatial relation at the beginning of the AP SRS transmission (or at the beginning of the slot of the AP SRS transmission) or the active spatial relation at the beginning of the PDCCH that triggers the AP SRS transmission (or at the beginning of the slot of the PDCCH that triggers the AP SRS transmission) to the AP SRS transmission may be based on a capability of the UE.

In some cases where deciding whether to apply the beam update to the scheduled transmission is based on a capability of the UE, the UE or network entity may decide to apply the beam update to the scheduled transmission or apply a previous beam to the scheduled transmission, wherein the previous beam has an application time that occurs at or before a beginning of the DCI, or a slot of the DCI, scheduling the transmission.

For example, a first UE may have a capability that requires the active spatial relation at the time of the PDCCH that triggers the AP SRS transmission (at the beginning of the PDCCH or at the beginning of the slot of the PDCCH) to be used, while a second UE may have a capability that allows for the active spatial relation at the time of the AP SRS transmission (at the beginning of the AP SRS transmission or at the beginning of the slot of the AP SRS transmission) to be used.

Figure 13:
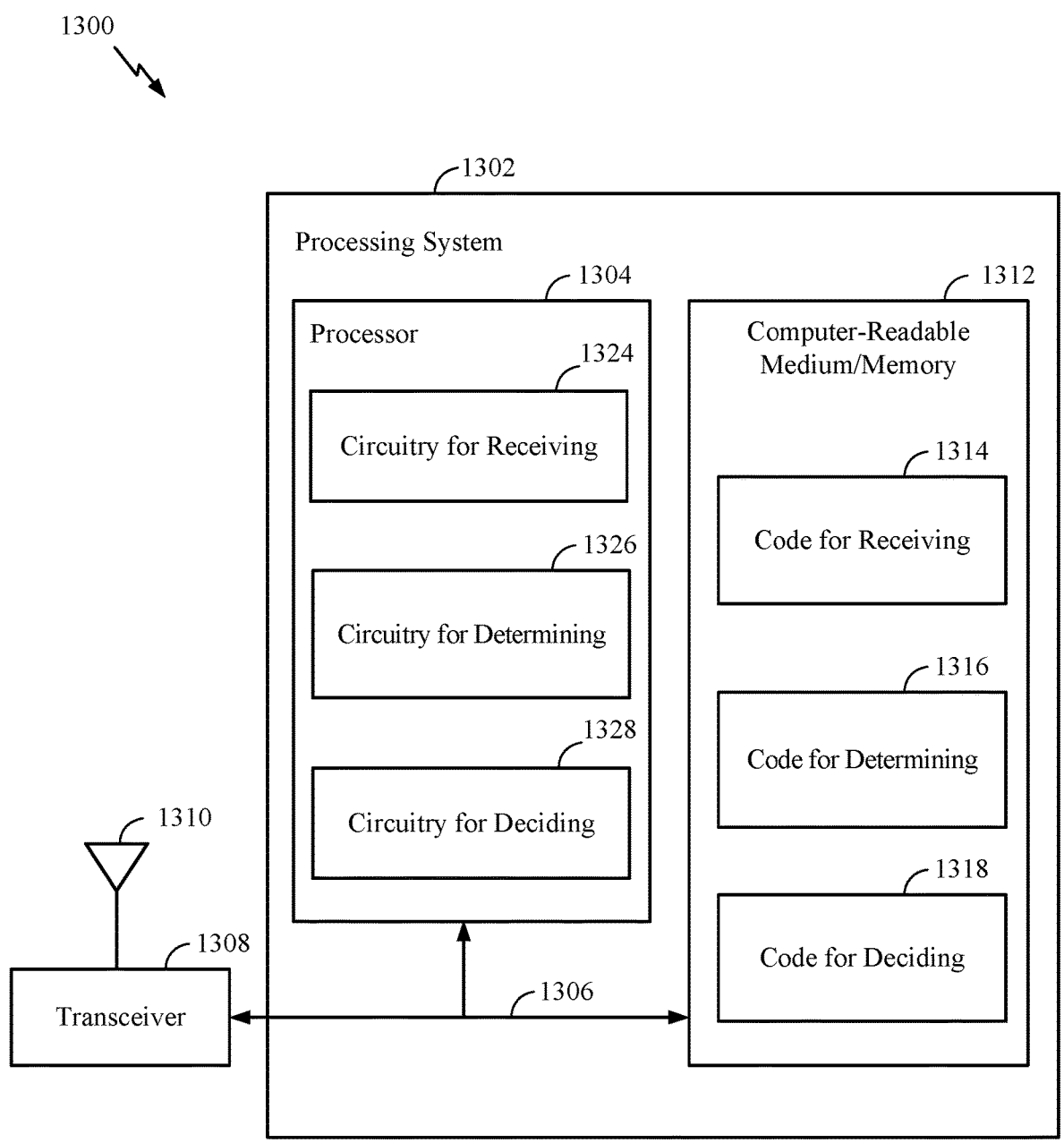
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 10. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 10, or other operations for performing the various techniques discussed herein for beam updating. In certain aspects, computer-readable medium/memory 1312 stores code 1314 for receiving (e.g., for receiving signaling indicating a beam update); code 1316 for determining (e.g., for determining an application time of the beam update occurs between a DCI scheduling a transmission and the scheduled transmission); and code 1318 for deciding (e.g., for deciding whether to apply the beam update to the scheduled transmission), etc. In certain aspects, the processor 1304 has circuitry configured to implement the code stored in the computer-readable medium/memory 1312. The processor 1304 includes circuitry 1324 for receiving (e.g., for receiving signaling indicating a beam update); circuitry 1326 for determining (e.g., for determining an application time of the beam update occurs between a DCI scheduling a transmission and the scheduled transmission); and circuitry 1328 for deciding (e.g., for deciding whether to apply the beam update to the scheduled transmission), etc.

Figure 14:
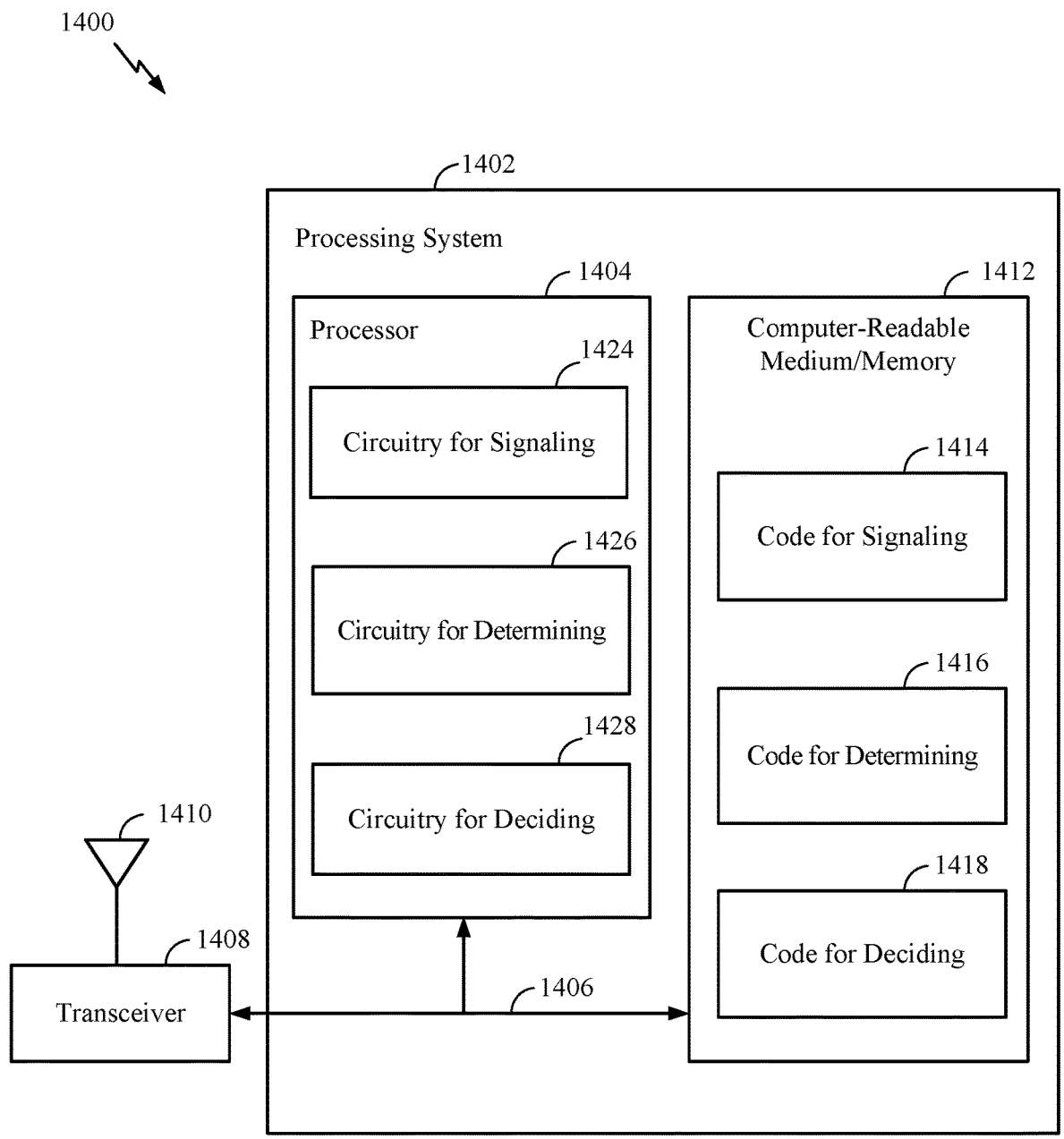
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 11. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1304 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 11, or other operations for performing the various techniques discussed herein for beam updating. In certain aspects, computer-readable medium/memory 1412 stores code 1414 for signaling (e.g., for signaling a UE an indication of a beam update); code 1416 for determining (e.g., for determining an application time of the beam update occurs between a DCI scheduling a transmission and the scheduled transmission); and code 1418 for deciding (e.g., for deciding whether to apply the beam update to the scheduled transmission), etc. In certain aspects, the processor 1404 has circuitry configured to implement the code stored in the computer-readable medium/memory 1412. The processor 1404 includes circuitry 1424 for signaling (e.g., for signaling a UE an indication of a beam update); circuitry 1426 for determining (e.g., for determining an application time of the beam update occurs between a DCI scheduling a transmission and the scheduled transmission); and circuitry 1428 for deciding (e.g., for deciding whether to apply the beam update to the scheduled transmission), etc.

Example Aspects

Aspect 1: A method for wireless communications by a user equipment (UE), comprising: receiving signaling indicating a beam update; determining an application time of the beam update occurs between a downlink control information (DCI) scheduling a transmission and the scheduled transmission; and deciding whether to apply the beam update to the scheduled transmission.

Aspect 2: The method of Aspect 1, wherein the UE decides to apply the beam update to the scheduled transmission if one or more conditions are met.

Aspect 3: The method of Aspect 2, wherein the one or more conditions comprise a time between the application time of the beam update and a start of the scheduled transmission being at least a minimum duration.

Aspect 4: The method of Aspect 3, wherein the minimum duration comprises a fixed value.

Aspect 5: The method of Aspect 3 or 4, wherein the minimum duration comprises a value based on UE capability.

Aspect 6: The method of any of Aspects 3-5, wherein the minimum duration depends, at least in part, on a subcarrier spacing (SCS) of at least one of: a first component carrier (CC) of the DCI or a second CC of the scheduled transmission.

Aspect 7: The method of Aspect 6, wherein the minimum duration is based on a smallest SCS of the first and second CCs.

Aspect 8: The method of any of Aspects 1-7, wherein the UE decides to not apply the beam update to the scheduled transmission.

Aspect 9: The method of any of Aspects 1-8, wherein the beam update is indicated via a transmission configuration indicator (TCI) state.

Aspect 10: The method of any of Aspects 1-9, wherein the beam update is indicated via a spatial relation.

Aspect 11: The method of any of Aspects 1-10, wherein the beam update is indicated via an uplink (UL) transmission configuration indicator (TCI) state.

Aspect 12: The method of any of Aspects 1-11, wherein the beam update is indicated via a medium access control (MAC) control element (CE) (MAC-CE); and the application time of the beam update is a fixed duration after an end of an acknowledgment of a physical downlink shared channel (PDSCH) carrying the MAC-CE.

Aspect 13: The method of any of Aspects 1-12, wherein: the DCI schedules multiple transmissions; and the decision to apply the beam update to a first scheduled transmission of the multiple scheduled transmissions is also applied to other scheduled transmissions of the multiple scheduled transmissions.

Aspect 14: The method of any of Aspects 1-13, wherein: the DCI schedules multiple transmissions; and the UE decides, for each scheduled transmission separately, whether to apply the beam update to each scheduled transmission.

Aspect 15: The method of Aspect 14, wherein deciding whether to apply the beam update to each scheduled transmission is based on at least one of: whether the application time of the beam update for each scheduled transmission is after a start of a scheduled transmission for a first transmission of the multiple scheduled transmissions, wherein the first transmission is the first scheduled transmission of the multiple scheduled transmissions; and whether the application time of the beam update for each scheduled transmission is before each corresponding scheduled transmission.

Aspect 16: The method of any of Aspects 1-15, wherein deciding whether to apply the beam update to the scheduled transmission is based on a capability of the UE; and the UE decides to apply the beam update to the scheduled transmission or apply a previous beam to the scheduled transmission, wherein the previous beam has an application time that occurs at or before a beginning of the DCI, or a slot of the DCI, scheduling the transmission.

Aspect 17: The method of any of Aspects 1-16, further comprising transmitting an indication of the capability of the UE.

Aspect 18: A method for wireless communication by a network entity, comprising: signaling a user equipment (UE) an indication of a beam update; determining an application time of the beam update occurs between a downlink control information (DCI) scheduling a transmission and the scheduled transmission; and deciding whether to apply the beam update to the scheduled transmission.

Aspect 19: The method of Aspect 18, wherein the network entity decides to apply the beam update to the scheduled transmission if one or more conditions are met.

Aspect 20: The method of Aspect 19, wherein the one or more conditions comprise a time between the application time of the beam update and a start of the scheduled transmission being at least a minimum duration.

Aspect 21: The method of Aspect 20, wherein the minimum duration comprises a fixed value.

Aspect 22: The method of Aspect 20 or 21, wherein the minimum duration comprises a value based on UE capability.

Aspect 23: The method of any of Aspects 20-22, wherein the minimum duration depends, at least in part, on a subcarrier spacing (SCS) of at least one of: a first component carrier (CC) of the DCI or a second CC of the scheduled transmission.

Aspect 24: The method of Aspect 23, wherein the minimum duration is based on a smallest SCS of the first and second CCs.

Aspect 25: The method of any of Aspects 18-24, wherein: the DCI schedules multiple transmissions; and the decision to apply the beam update to a first scheduled transmission of the multiple scheduled transmissions is also applied to other scheduled transmissions of the multiple scheduled transmissions.

Aspect 26: The method of any of Aspects 18-25, wherein: the DCI schedules multiple transmissions; and the network entity decides, for each scheduled transmission separately, whether to apply the beam update to each scheduled transmission.

Aspect 27: The method of Aspect 26, wherein deciding whether to apply the beam update to each scheduled transmission is based on at least one of: whether the application time of the beam update for each scheduled transmission is after a start of a scheduled transmission for a first transmission of the multiple scheduled transmissions, wherein the first transmission is the first scheduled transmission of the multiple scheduled transmissions; and whether the application time of the beam update for each scheduled transmission is before each corresponding scheduled transmission.

Aspect 28: The method of any of Aspects 18-27, further comprising receiving an indication of the capability of the UE, wherein deciding whether to apply the beam update to the scheduled transmission is based on the capability of the UE; and the network entity decides to apply the beam update to the scheduled transmission or apply a previous beam to the scheduled transmission, wherein the previous beam has an application time that occurs at or before a beginning of the DCI, or a slot of the DCI, scheduling the transmission.

Aspect 29: An apparatus for wireless communications by a user equipment (UE), comprising: a memory; and at least one processor coupled with the memory and configured to: receive signaling indicating a beam update; determine an application time of the beam update occurs between a downlink control information (DCI) scheduling a transmission and the scheduled transmission; and decide whether to apply the beam update to the scheduled transmission.

Aspect 30: An apparatus for wireless communications by a network entity, comprising: a memory; and at least one processor coupled with the memory and configured to: signal a user equipment (UE) an indication of a beam update; determine an application time of the beam update occurs between a downlink control information (DCI) scheduling a transmission and the scheduled transmission; and decide whether to apply the beam update to the scheduled transmission.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 10 and 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
receiving signaling indicating a beam update;
determining an application time of the beam update occurs between a downlink control information (DCI) scheduling a transmission and the scheduled transmission; and
deciding whether to apply the beam update to the scheduled transmission based on a time between the application time of the beam update and a start of the scheduled transmission.

2. The method of claim 1, wherein the time between the application time of the beam update and a start of the scheduled transmission is at least a minimum duration.

3. The method of claim 2, wherein the minimum duration comprises a fixed value.

4. The method of claim 3, wherein the fixed value is zero.

5. The method of claim 2, wherein the minimum duration comprises a value based on UE capability.

6. The method of claim 2, wherein the minimum duration depends, at least in part, on a subcarrier spacing (SCS) of at least one of: a first component carrier (CC) of the DCI or a second CC of the scheduled transmission.

7. The method of claim 6, wherein the minimum duration is based on a smallest SCS of the first and second CCs.

8. The method of claim 1, wherein the UE decides to not apply the beam update to the scheduled transmission.

9. The method of claim 1, wherein the beam update is indicated via a transmission configuration indicator (TCI) state.

10. The method of claim 1, wherein the beam update is indicated via a spatial relation.

11. The method of claim 1, wherein the beam update is indicated via an uplink (UL) transmission configuration indicator (TCI) state.

12. The method of claim 1, wherein
the beam update is indicated via a medium access control (MAC) control element (CE) (MAC-CE); and
the application time of the beam update is a fixed duration after an end of an acknowledgment of a physical downlink shared channel (PDSCH) carrying the MAC-CE.

13. The method of claim 1, wherein:
the DCI schedules multiple transmissions; and
the decision to apply the beam update to a first scheduled transmission of the multiple scheduled transmissions is also applied to other scheduled transmissions of the multiple scheduled transmissions.

14. The method of claim 1, wherein:
the DCI schedules multiple transmissions; and
the UE decides, for each scheduled transmission separately, whether to apply the beam update to each scheduled transmission.

15. The method of claim 14, wherein deciding whether to apply the beam update to each scheduled transmission is based on at least one of:
whether the application time of the beam update for each scheduled transmission is after a start of a scheduled transmission for a first transmission of the multiple scheduled transmissions, wherein the first transmission is the first scheduled transmission of the multiple scheduled transmissions; and
whether the application time of the beam update for each scheduled transmission is before each corresponding scheduled transmission.

16. The method of claim 1, wherein deciding whether to apply the beam update to the scheduled transmission is based on a capability of the UE; and
the UE decides to apply the beam update to the scheduled transmission or apply a previous beam to the scheduled transmission, wherein the previous beam has an application time that occurs at or before a beginning of the DCI, or a slot of the DCI, scheduling the transmission.

17. The method of claim 1, further comprising transmitting an indication of capability of the UE.

18. A method for wireless communication by a network entity, comprising:
signaling a user equipment (UE) an indication of a beam update;
determining an application time of the beam update occurs between a downlink control information (DCI) scheduling a transmission and the scheduled transmission; and deciding whether to apply the beam update to the scheduled transmission based on a time between the application time of the beam update and a start of the scheduled transmission.

19. The method of claim 18, wherein the a time between the application time of the beam update and a start of the scheduled transmission is at least a minimum duration.

20. The method of claim 19, wherein the minimum duration comprises a fixed value.

21. The method of claim 19, wherein the minimum duration comprises a value based on UE capability.

22. The method of claim 19, wherein the minimum duration depends, at least in part, on a subcarrier spacing (SCS) of at least one of: a first component carrier (CC) of the DCI or a second CC of the scheduled transmission.

23. The method of claim 22, wherein the minimum duration is based on a smallest SCS of the first and second CCs.

24. The method of claim 18, wherein:
the DCI schedules multiple transmissions; and
the decision to apply the beam update to a first scheduled transmission of the multiple scheduled transmissions is also applied to other scheduled transmissions of the multiple scheduled transmissions.

25. The method of claim 18, wherein:
the DCI schedules multiple transmissions; and
the network entity decides, for each scheduled transmission separately, whether to apply the beam update to each scheduled transmission.

26. The method of claim 25, wherein deciding whether to apply the beam update to each scheduled transmission is based on at least one of:
whether the application time of the beam update for each scheduled transmission is after a start of a scheduled transmission for a first transmission of the multiple scheduled transmissions, wherein the first transmission is the first scheduled transmission of the multiple scheduled transmissions; and
whether the application time of the beam update for each scheduled transmission is before each corresponding scheduled transmission.

27. The method of claim 18, further comprising receiving an indication of capability of the UE, wherein deciding whether to apply the beam update to the scheduled transmission is based on the capability of the UE; and
the network entity decides to apply the beam update to the scheduled transmission or apply a previous beam to the scheduled transmission, wherein the previous beam has an application time that occurs at or before a beginning of the DCI, or a slot of the DCI, scheduling the transmission.

28. An apparatus for wireless communications by a user equipment (UE), comprising:
a memory; and
at least one processor coupled with the memory and configured to:
receive signaling indicating a beam update;
determine an application time of the beam update occurs between a downlink control information (DCI) scheduling a transmission and the scheduled transmission; and
decide whether to apply the beam update to the scheduled transmission based on a time between the application time of the beam update and a start of the scheduled transmission.

29. An apparatus for wireless communications by a network entity, comprising:
a memory; and
at least one processor coupled with the memory and configured to:
signal a user equipment (UE) an indication of a beam update;
determine an application time of the beam update occurs between a downlink control information (DCI) scheduling a transmission and the scheduled transmission; and
decide whether to apply the beam update to the scheduled transmission based on a time between the application time of the beam update and a start of the scheduled transmission.

* * * * *